Aug. 19, 1952  W. A. SCHLUETER  2,607,214
RECORDING LIQUID GRAVITOMETER
Filed March 16, 1949  3 Sheets-Sheet 2
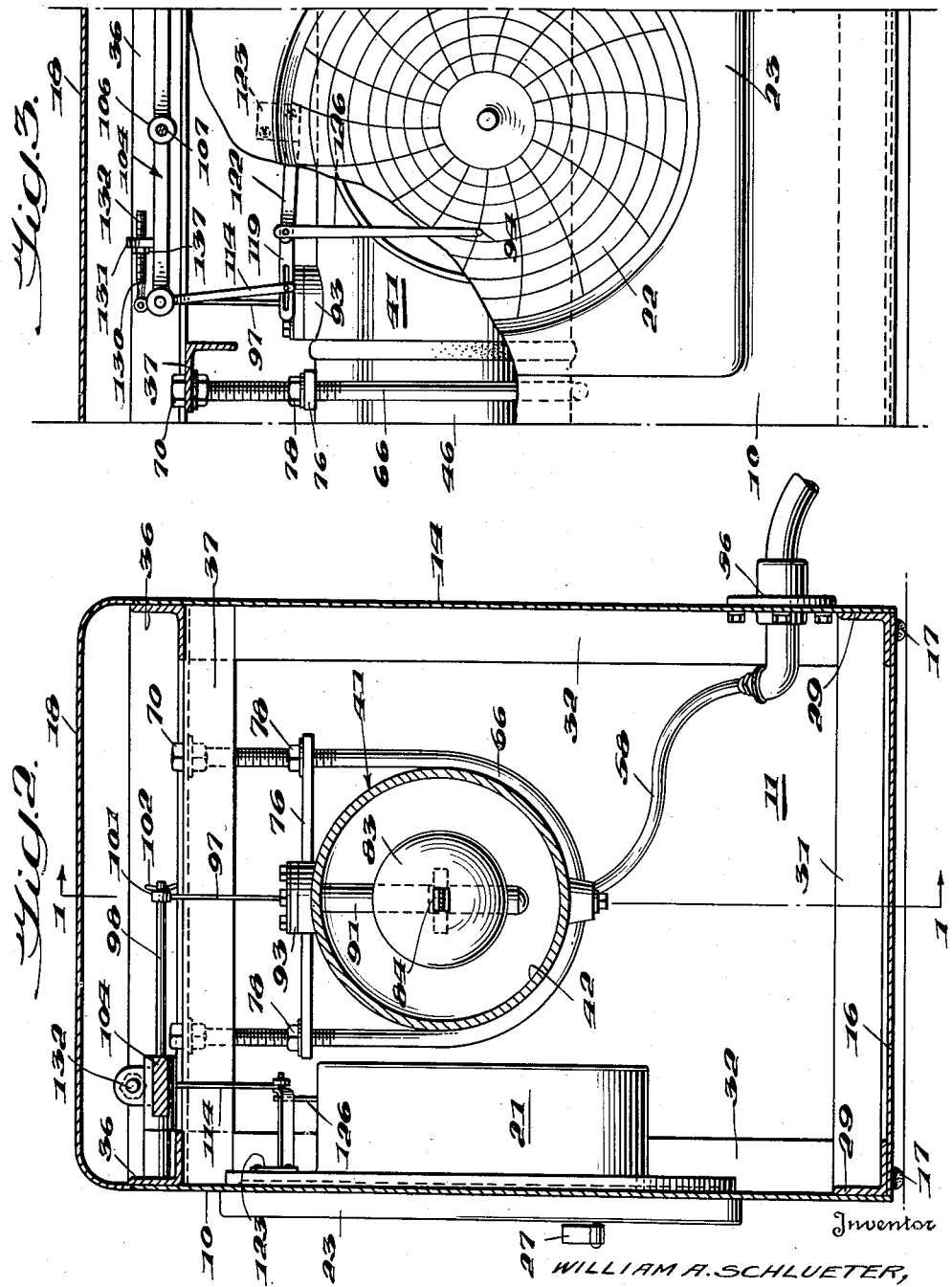
Inventor
WILLIAM A. SCHLUETER,
By Lloyd P. Clark
Attorney Aug. 19, 1952 W. A. SCHLUETER 2,607,214
RECORDING LIQUID GRAVITOMETER
Filed March 16, 1949 3 Sheets-Sheet 3

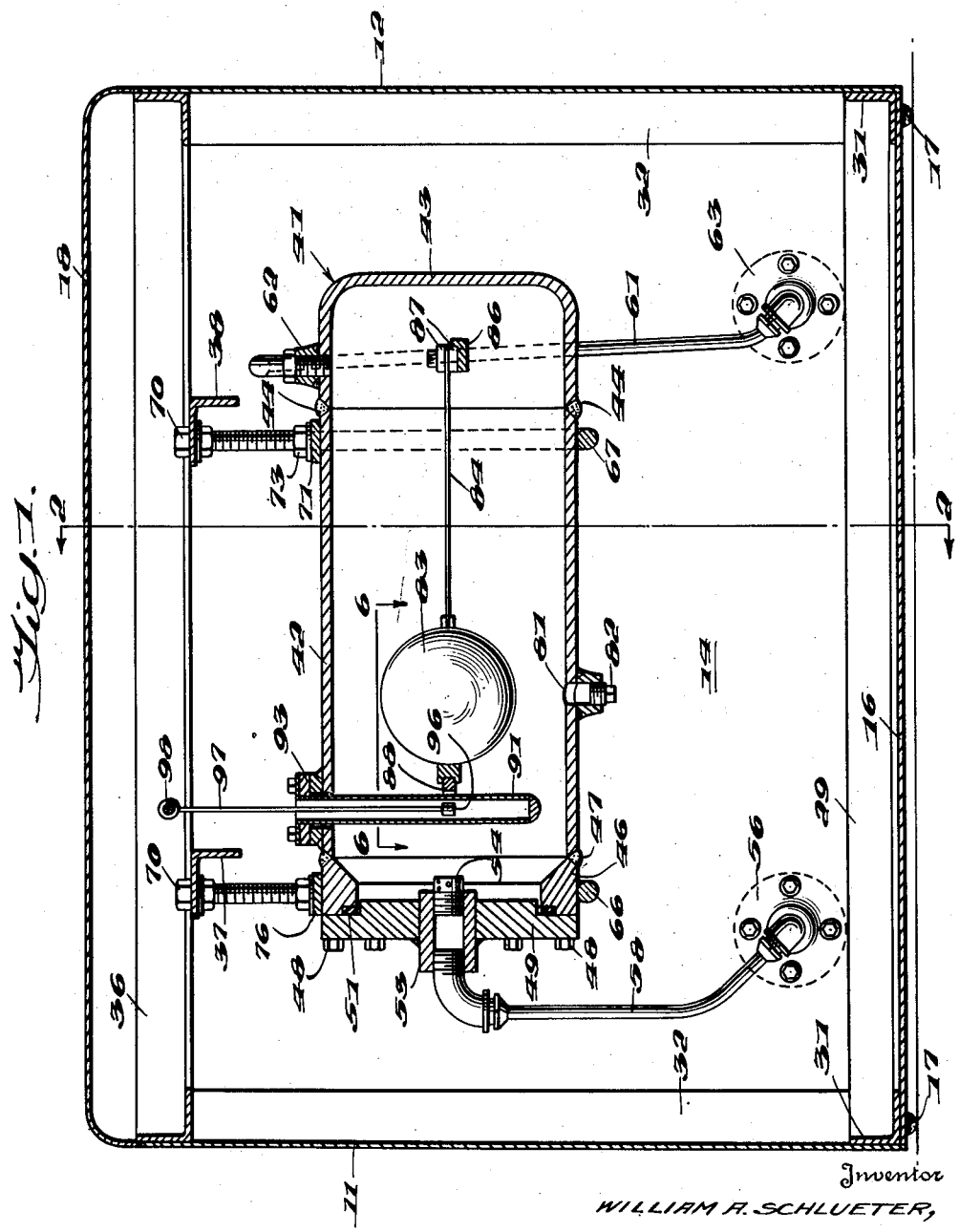

Inventor
WILLIAM A. SCHLUETER,
By Lloyd P. Shank
Attorney

Patented Aug. 19, 1952

2,607,214

UNITED STATES PATENT OFFICE 2,607,214

RECORDING LIQUID GRAVITOMETER

William A. Schlueter, Tulsa, Okla.

Application March 16, 1949, Serial No. 81,799

4 Claims. (Cl. 73—33)

The present invention relates to an apparatus for indicating and recording the specific gravity or density of liquids especially flowing liquids which may be subjected to conditions of high pressure and to changes in temperature.

An object of the invention is to provide an instrument for recording continuously the specific gravity of liquids such as petroleum products wherein the liquids may be under pressure as high as one thousand pounds per square inch and subject to temperature variations throughout a range of approximately zero degrees to one hundred and fifty degrees Fahrenheit.

A further object of the invention is to provide a unitary device for recording the specific gravity of liquids so designed as not to require any electrical power line connections for its operation and to provide a recorder which will require no auxiliary power source other than that which is stored in the recorder case proper such as a spring wound motor for driving the record chart.

A still further object of the invention is to provide apparatus for indicating and recording the specific gravity or density of a liquid under pressure utilizing the buoyancy principle for indicating changes in specific gravity and to provide for the transfer of movements of a float across a pressure barrier without any direct connection between the buoyancy influenced element and the indicating and recording means.

A more detailed object of the invention is to provide a chamber within which liquid from the sample line is directed provided with a float including magnetic means for transmitting movement of the float across a pressure barrier to operate a linkage mechanism of the recording mechanism including means for altering the position of the float chamber and other means to facilitate calibration of the apparatus.

Another object of the invention is to provide a novel mechanism for transferring movement of the buoyant element of a gravitometer to a pen of the recording mechanism wherein friction of the parts is reduced to a negligible amount and a linkage assembly which may be readily adjusted to properly coordinate the position of a recording pen with the moving record chart.

Other objects and features of the invention will be more apparent to those skilled in the art to which this invention pertains as the present disclosure proceeds and upon consideration of the following detailed description and the accompanying drawings wherein an exemplary embodiment of the invention is disclosed.

In the drawings:

Fig. 1 is a longitudinal sectional view of a recording gravitometer exhibiting the invention taken on the line 1—1 of Fig. 2.

Fig. 2 is a transverse sectional view taken on the line 2—2 of Fig. 1.

Fig. 3 is a fragmentary elevational view of the recording mechanism with parts broken away to illustrate a part of the pen actuating linkage.

Figure 4:
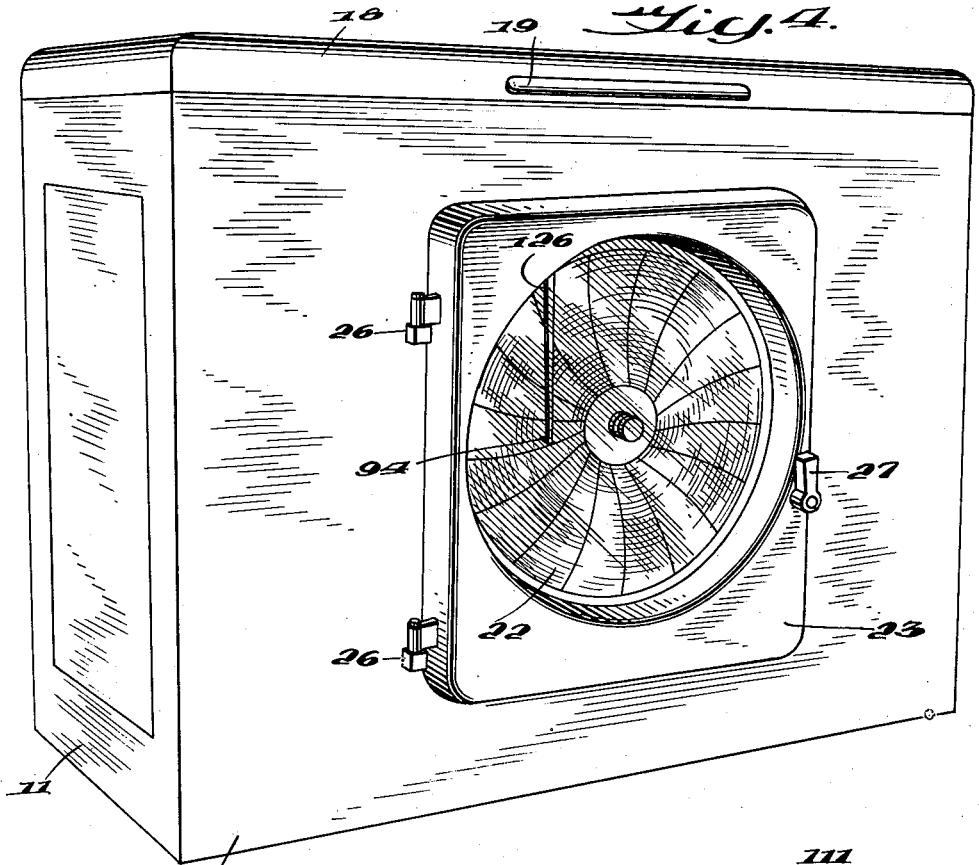
Fig. 4 is a perspective front elevational view of the device.

A gravitometer embodying the invention is enclosed within a casing so as to be readily portable and suitable for bracket mounting or for support on a table or the like. The nature of the casing will be apparent upon consideration of Fig. 4. The casing may be formed of sheet metal or the like to include a front wall 10, end walls 11 and 12 and a rear wall 14. The casing also includes a bottom wall 16 which may be provided with cushion elements 17 for supporting the housing on a table or the like. The upper portion of the casing is closed by a removable cover 18 which may also be formed of sheet material and may be provided with recesses one of which is shown at 19 for receiving the fingers for lifting the lid from the casing.

The front wall 10 of the housing also provides means for supporting a recording mechanism enclosed within a casing 21 mounted on the inner face of the front wall of the cabinet. This recording mechanism includes a chart 22 which is adapted to be driven in a well-known manner by means of a spring-wound clock mechanism arranged within the casing 21. A door 23 is provided with a transparent pane for protecting the recording chart. The door is mounted on hinges 26 for swinging movement to permit the chart 22 to be replaced. Any suitable latch or detent may be provided and operated by the handle 27 for retaining the door 23 in a closed position.

The operative elements of the gravitometer are supported on a frame within the housing or casing. This frame includes longitudinally extending members 29 arranged along the bottom portion of the housing and these angle bars are adapted to be connected by transverse members 31. An upright member 32 extends upwardly from the base portion of the frame at each corner of the housing. These posts 32 may be welded to the angle bars 29 and 31 or otherwise connected to provide a relatively rigid frame structure. Additional angle bars 36 extend longitudinally of the housing adjacent the top thereof and these members are connected by transverse angle bars 37 and 38. The transverse members 37 and 38 may be welded or otherwise secured to the horizontal flange portions of the longitudinally extending angle bars 36. It will be appreciated that a substantial frame is thereby provided for reinforcing the housing and to provide support for a float chamber and other elements of the apparatus as hereinafter described.

Apparatus exhibiting the invention includes a float chamber in the nature of a hollow rigid capsule indicated generally at 41 which may be formed of steel or any suitable metal for withstanding pressures therein up to about one thousand pounds per square inch. In the embodiment illustrated in the drawings, the central portion of the float chamber is formed as a tubular section 42 having any suitable diameter. A cup-shaped portion 43 closes one end of the tube 42 and may be welded thereto as indicated at 44. The other end of the tubular section 42 is provided with an annular member 46 which may also be welded to the tubular section 42 as shown at 47. The annular fitting 46 has sufficiently radial dimension for receiving cap screws 48 employed for removably securing an end plate 49 in position closing the float chamber. A gasket 51 may be interposed between the cover plate 49 and the annular fitting 46 to seal this end portion of the float chamber. The cover plate 49 is provided with an axially disposed opening for receiving a pipe fitting 53. The inner end of the pipe fitting 53 may be provided with screen or apertured cup 54 for the purpose of diffusing any of the incoming liquid throughout the float chamber 41. The float chamber may be provided with a drain opening 81 through which sediment and the like may be removed after the threaded plug 82 is disengaged from a position closing the drain opening.

In carrying out the invention liquid under pressure is taken from a sample line (not shown) and supplied to a conduit fitting 56 which is mounted on the back wall 14 of the apparatus. A conduit or pipe 58 extends from the fitting 56 into communication with the pipe fitting 53. Liquid under pressure, the specific gravity of which is to be determined thus enters the float chamber 41 through the diffusion fitting 54. The conduit 58 may be formed of flexible metal so as to facilitate connection of the device and permit adjustments in the position of the float chamber relative to the frame and the housing as hereinafter described. An outlet conduit 61 is connected to the opposite end of the float chamber 41 by means of a pipe fitting illustrated at 62. The conduit 61 extends to conduit fitting 63 mounted on the back wall 14 of the housing. The liquid under test is led back to the sample line or to a sump where the test liquid is to be stored through the pipe 61. The conduit 61 is also formed of flexible material so as to permit adjustment in the position of the float chamber.

The float chamber 41 is supported within the housing and on the frame by means of two U-shaped brackets 66 and 67. The upper ends of the legs of these brackets extend through openings in the transverse angle bars 37 and 38. Nuts arranged on opposite sides of the horizontal flanges of these transverse members maintain the U-shaped brackets in a fixed position and also permit adjustment of the position of the float chamber relative to the frame. A bar 71 is arranged over the float chamber and is provided with openings through which the legs of the U-shaped bracket 67 extend. This bar may be moved into clamping engagement with the periphery of the tubular section 42 by means of nuts threaded on the legs of the bracket 67 one of which is shown at 73 in Fig. 1. A similar bar 76 is provided with openings through which the legs of the U-shaped brackets 66 extend. Nuts 78 threaded on the legs of the U-shaped bracket 66 provide an arrangement which permits the bar 76 to be urged into clamped engagement with a part of the float chamber and particularly the annular fitting 46. The float chamber is thereby supported in an adjustable fixed position relative to the frame.

A float 83 is arranged within the chamber 41. This float is preferably spherical shaped to withstand pressures under which the liquids undergoing test are subjected. The float may have a diameter of approximately three inches when the float chamber has a cross sectional dimension of about six inches. The float is supported at the free end of a leaf spring 84. The leaf spring is anchored adjacent the exhaust end of the float chamber by means of a bracket 86 and clamping members 87. The float carries a permanent magnet 88 at a point diametrically opposite the free end of the spring 84. This magnet may be formed of a suitable alloy adapted to maintain its magnetic characteristics over a relatively long period. The magnet 88 may be mounted on the float 83 in any suitable fixed manner and the magnet is preferably C-shaped in plan as will be apparent from a consideration of Fig. 6. The magnet 88 is adapted to embrace a tube 91 formed of non-magnetic material such as stainless steel. The tube 91 is closed and sealed at its lower end but is in open communication at its upper end with the interior of the housing and accordingly with the atmosphere. Any suitable means may be provided for securing the tube 91 to the top of the float chamber and a suitable clamping assembly is indicated at 93 to provide a sealed juncture between the tube and the float chamber wall.

In apparatus exhibiting the invention means or a mechanical linkage is provided for transferring any changes in the position of the float 83 to a pen 94 arranged in operable association with the recording chart 22. In the embodiment illustrated this transmission means includes a magnetic follower 96 formed of soft iron and secured to the lower end of a relatively small diameter non-magnetic rod 97 suspended within the tube 91. The follower or armature 96 is cylindrical shaped to move freely within the tube 91 and at the same time reduce the air-gap to a minimum. The rod 97 is connected at its upper end to a shaft 98 in any suitable manner such as by means of an eyelet 101 and a cotter key 102. The shaft 98 extends through bearings 103 carried by an end of a balance beam shown generally at 104. The balance beam is mounted for pivoting movement about the axis of the bearing 106. A suitable pivot pin 107 extends through this bearing and is secured to a part of the frame structure. The other end of the balance beam 104 carries a weight 111 which is threaded and adapted to be moved on the threaded portion 112 so that the weight of the magnetic follower 96 and other parts of the linkage may be properly counterbalanced.

Figures 5, 6:
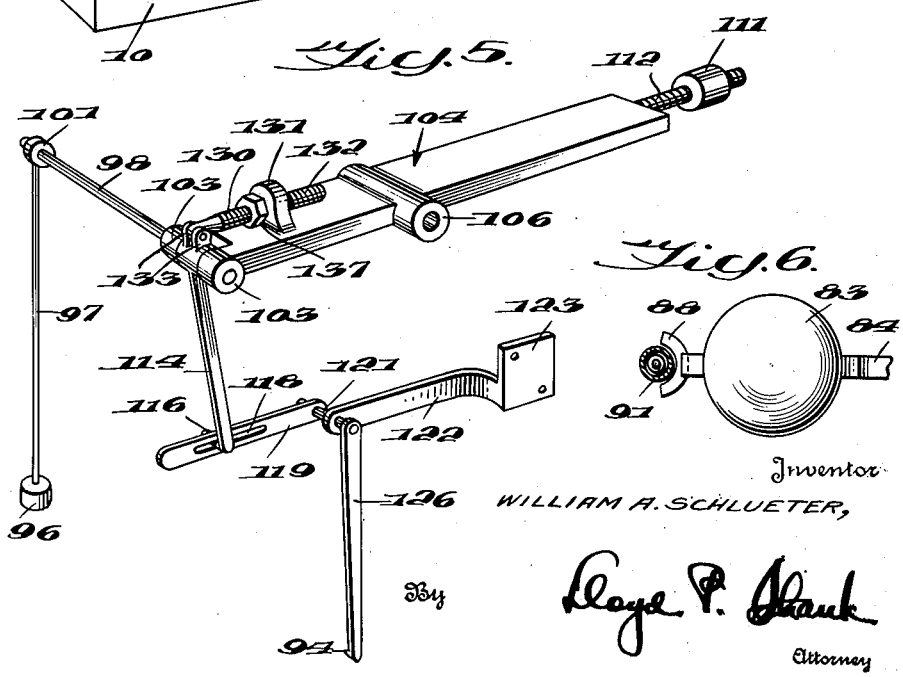
Fig. 5 is a skeleton perspective view of the linkage for transmitting movements of the float to the recording pen.
Fig. 6 is a sectional view taken on the line 6—6 of Fig. 1.

A lever 114 extends downwardly from the end of the balance beam 104 and is mounted to rotate about the axis of the shaft 98 between the bearings 103 as shown in Fig. 5. A laterally projecting pin 116 is carried by the lower end of the lever 114 and extends through a slot 118 in an arm 119. The other end of the arm 119 is keyed or otherwise secured to a shaft 121. The shaft 121 is journaled for rotation on a bracket arm 122 supported on a part of the recorder casing 21 by means of an enlarged plate portion 123. The recording pen 94 is carried by the lower end of a depending arm 126 which extends into the recording casing and in operative association with the front face of the record chart 22.

The motion transmitting linkage includes means for adjusting the position of the pen 94 radially of the chart 22 and such adjustment means is shown in Fig. 5 and includes a lug 131 carried by or secured to the upper face of the balance beam 104. A longitudinally shiftable member 130 carrying threads 132 thereon extends through an opening in the lug 131. This member is connected at its other end to two upstanding ears 133 fixed to and extending in an opposite diametrically direction from the lever 114. A pivotal connection is thereby provided between the member 130 and the ears 133. A pair of nuts one of which is shown at 137 are provided for shifting the position of the member 130 longitudinally of the balance beam and to thereby adjust the angular position of the lever 114 and accordingly the position of the pin 116 in the slot 118. Accordingly, the effective length of the lever arm 119 is thereby altered to adjust the position of the pen 94 relative to the axis of the record chart 22.

In use of the apparatus liquid is taken from a sample line and admitted to the float chamber 41 through the inlet conduit 58. As the liquid enters the float chamber, it is diffused by the fitting 54 and any changes in the density of the liquid is distributed throughout the float chamber. The float 83 then assumes a position in dependence upon the specific gravity of the liquid and any change in the vertical position of the float is accompanied by movement of the magnetic follower 96. If there is a change in the specific gravity of the liquid entering the float chamber and if the specific gravity is lower, the buoyancy of the liquid within the chamber 41 is accordingly less and the float 83 will assume a new and lowered position. As the float 83 moves downwardly the follower 96 being linked by the flux produced by the magnet 88 will also move downward and the shaft 98 will be pulled downward to turn the beam 104 in a counterclockwise direction in Figs. 3 and 5, about the axis of the pivot support 107. The lever 114 will thereby be moved downwardly and the pin 116 will cause the crank arm 119 to swing in a counter clockwise direction about the axis of the shaft 121 in Fig. 5. The pen supporting arm 126 being secured to the shaft 121 will turn therewith and swing the pen 94 in a counter clockwise direction about the axis of the shaft 121 and thereby move the pen towards the axis of the record chart 22.

It will be appreciated that if there is an opposite change in the specific gravity of the liquid moving through the float chamber 41 and if the density increases the float 83 will be buoyed upwardly and the magnetic follower 96 will also move upwardly. This upward movement of the rod 97 will cause the pen 94 to swing radially outward on the chart 22. The position of the pen 94 accordingly indicates the specific gravity of the liquid and the chart will provide a record of any changes in the density.

It will be observed that the float chamber 41 and the float 83 are designed to withstand pressures up to one thousand pounds per square inch and the pressure may vary without altering the accuracy of the apparatus. The pressure barrier provided by the tube 91 permits movement of the float to be transmitted to the exterior of the float chamber and the arrangement described and illustrated in the drawings provide a device having an accuracy comparable to that of a hydrometer over a range of temperature varying between zero and one hundred and fifty degrees Fahrenheit.

The adjustment as shown and described in association with the lug 131 on the balance beam for altering the angular position of the lever 114 and the position of the pin 116 in the slot 118 provides one arrangement for calibrating the instrument and properly positioning the pen 94 relative to the chart 22. It is to be noted that the float chamber 41 may be adjusted relative to the frame and the housing by adjusting the position of the nuts 70 on the threaded upper ends of the U-shaped brackets 66 and 67 to thereby alter the position of the float chamber. This adjustment provides changes in the position of the float 83 relative to the transmission linkage so that the apparatus may be properly calibrated.

While the invention has been described with reference to specific structural features and with regard to a particular general organization, it will be appreciated that changes may be made in the details as well as the overall arrangement. Such modifications and others may be made without departing from the spirit and scope of the invention as set forth in the appended claims.

What I claim and desire to secure by Letters Patent is:

1. In apparatus for indicating changes in the specific gravity of a liquid under pressure, an elongated hollow capsule providing a closed chamber for receiving the liquid under observation, means supporting the capsule in a horizontally disposed position, a closed end non-magnetic tube of smaller diameter than its length vertically arranged diametrically within the capsule and having an open end outside the capsule, means sealing the periphery of said tube with respect to said capsule, a rod depending into said tube, means including an element on the rod for moving the rod axially in response to changes in the specific gravity of the liquid within the capsule, a movable indicating arm, a horizontally disposed beam connected at one end to said rod, means for balancing said beam to compensate for the weight of the rod and the element thereon, and means for transmitting movements of said beam to said indicating arm.

2. In apparatus for indicating changes in the specific gravity of a liquid under pressure, a hollow capsule providing a closed chamber for receiving the liquid under observation, a housing encasing the capsule having a window opening in one side, a frame within and reinforcing the housing, means supporting the capsule on the frame in a horizontally disposed position, a closed end tube depending vertically into the capsule and having an open end outside the closed chamber, means sealing the periphery of said tube with respect to the capsule, a rod depending into said tube and projecting from the open end thereof, means including an element on the rod within the tube for moving the rod upwardly and downwardly in response to changes in the specific gravity of the liquid within the capsule, an indicating arm swingably mounted to be visible through said window, a horizontally disposed beam connected at one end to said rod and mounted for pivotal movement on said frame, an adjustable weight on the other end of the beam for balancing said beam to compensate for the weight of the rod and the element thereon, and means for transmitting movements of said beam to said indicating arm.

3. In apparatus for indicating changes in the specific gravity of a liquid under pressure, a hollow capsule providing a closed chamber for receiving the liquid under observation, a housing encasing the capsule having a window opening in one side, a frame within and reinforcing the housing, means supporting the capsule on the frame in a horizontally disposed position, a closed end tube depending vertically into the capsule and having an open end outside the closed chamber, means sealing the periphery of said tube with respect to the capsule, a rod depending into said tube and projecting from the open end thereof, means including an element on the rod within the tube for moving the rod upwardly and downwardly in response to changes in the specific gravity of the liquid within the capsule, an indicating arm swingably mounted to be visible through said window, a horizontally disposed beam connected at one end to said rod and mounted for pivotal movement on said frame, an adjustable weight on the other end of the beam for balancing said beam to compensate for the weight of the rod and the element thereon, means for transmitting movements of said beam to said indicating arm, and means for adjusting the vertical position of the capsule relative to the frame.

4. In apparatus for indicating changes in the specific gravity of a liquid under pressure, a hollow capsule providing a closed chamber for receiving the liquid under pressure, a housing encasing the capsule having a window opening in one side, a frame within and reinforcing the housing, means supporting the capsule on the frame in a horizontally disposed position, a closed end tube depending vertically into the capsule and having an open end outside the closed chamber, means sealing the periphery of said tube with respect to the capsule, a rod depending into said tube and projecting from the open end thereof, means including an element on the rod within the tube for moving the rod upwardly and downwardly in response to changes in the specific gravity of the liquid within the capsule, an indicating arm swingably mounted to be visible through said window opening, a horizontally disposed beam connected at one end to said rod and mounted for pivotal movement on said frame, means for balancing said beam to compensate for the weight of the rod and the element thereon, a lever attached to and extending substantially at right angles from said beam, a crank arm connected to said indicating arm and having a slot therein, a pin carried by said lever extending into said slot so as to swing the crank arm and the indicating arm upon movements of the beam, and means for adjusting the angular position of the lever relative to said beam.

WILLIAM A. SCHLUETER.

REFERENCES CITED

The following references are of record in the file of this patent:

UNITED STATES PATENTS

| Number | Name | Date |
|---|---|---|
| 699,188 | Kent | May 6, 1902 |
| 1,174,787 | Wilkinson | Mar. 7, 1916 |
| 1,384,886 | Brindle | July 19, 1921 |
| 1,546,702 | Bailey | July 21, 1925 |
| 1,701,404 | Dennis | Feb. 5, 1929 |
| 1,798,589 | Cole | Mar. 31, 1931 |
| 1,922,362 | Halversen | Aug. 15, 1933 |

FOREIGN PATENTS

| Number | Country | Date |
|---|---|---|
| 130,758 | Switzerland | Mar. 1, 1929 |